INVENTOR
CLARENCE W. HEWLETT, JR.

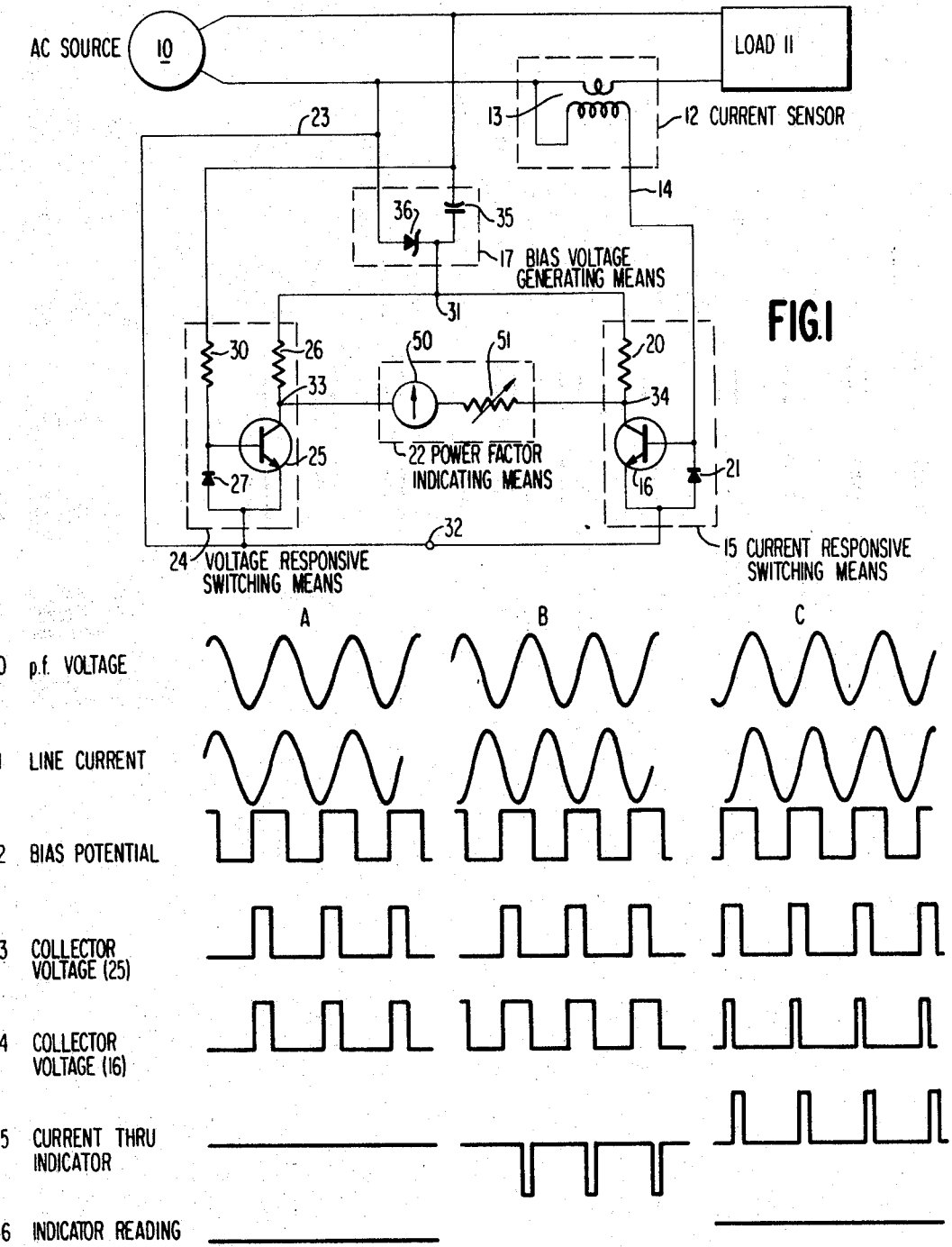

BY George A. Herbster

ATTORNEY

United States Patent Office 3,562,647
Patented Feb. 9, 1971

3,562,647
POWER FACTOR TRANSDUCER HAVING VOLTAGE AND CURRENT RESPONSIVE SWITCHING MEANS BIASED BY AN INTERMITTENTLY GENERATED VOLTAGE
Clarence Wilson Hewlett, Jr., Hampton, N.H., assignor to General Electric Company, a corporation of New York
Filed Mar. 14, 1969, Ser. No. 807,219
Int. Cl. G01r 25/00
U.S. Cl. 324—86                                                8 Claims

ABSTRACT OF THE DISCLOSURE

A power factor transducer. First and second switching means in a bridge circuit are closed during corresponding half cycles of line current and a power factor voltage, power factor voltage being in phase with line current at unity power factor. Line voltage energizes the bridge through a capacitor only during positive going power factor voltage half-cycles. Bridge imbalance, caused by non-simultaneous switching during non-unity power factor conditions indicates the power factor.

BACKGROUND OF THE INVENTION

This invention relates to power factor measuring systems and, more specifically, to a transducer for producing a power factor indication.

Power factor may be measured and analyzed by several diverse methods. For example, watts and volt-amperes may be measured and compared. In another approach the phase displacement between sinusoidal voltages and currents indicates power factor. Several devices perform such analyses. For example, switching a circuit on and off at corresponding positions of first and second wave have indicated phase relationships. Another system has included a bridge circuit with switching transistors in each leg. Each transistor conducted during one half cycle of the voltage or current, respectively. However, this system incorporated latching circuitry to provide usable outputs.

In another approach, various impedance configurations have been energized by voltage and current signals to indicate power factor. Each of two parallel circuits included diverse reactive elements to produce two voltage pulses. These pulses were then added to pulses in phase with line current and the summed pulses were applied across a zero center meter. However, movement constantly occurred because the pulses passed in opposite directions through the meter. Therefore, if the meter were not sufficiently damped, or did not have sufficient inertia, visible meter movement occurred. This system was also susceptible to harmonic and line transient errors. A line transient applied to two different reactive elements could pass pulses of unequal magnitude to the opposite sides of the meter and thereby indicate a deviation from unity power factor when, in fact, no such deviation existed.

Therefore, it is an object of this invention to provide an improved means for measuring power factor.

Another object of this invention is to provide a power factor measuring means which is susbtantially insensitive to transients, harmonics and other disturbances.

Yet another object of this invention is to provide an improved power factor measuring means which is adapted for use with conventional indicating meters as a transducer.

Still another object of this invention is to provide a power factor transducer which is adapted for use with digital techniques.

Yet another object of this invention is to provide a power factor transducer which is adapted for measuring single phase power factor or, with minimal modification, power factor measurement in a balanced, three-phase power system.

Still yet another object of this invention is to provide a power factor transducer of simplified construction without adversely affecting accuracy.

SUMMARY

In accordance with one aspect of this invention, power factor is measured by selecting a predetermined line current condition and a corresponding condition in a power factor voltage, which is in phase with the line current at unity power factor. Bias is supplied through a pair of switching means to an indicator. The switching means change state with the predetermined conditions. Bias is supplied only during a given portion of the power factor voltage so that the indicator is energized only when the switching means are in different conductive states and the bias exists simultaneously therewith.

This invention is pointed out with particularity in the appended claims. Further objects and advantages of this invention may be obtained by referring to the following detailed description taken in conjunction with the accompanying drawings.

BRIEF DESCRIPTION OF THE DRAWINGS

FIG. 1 illustrates a specific embodiment of a single-phase power factor transducer and associated indicator;

FIG. 2 graphically depicts various wave forms useful in understanding this invention;

DESCRIPTION OF ILLUSTRATIVE EMBODIMENTS

Figure 4:
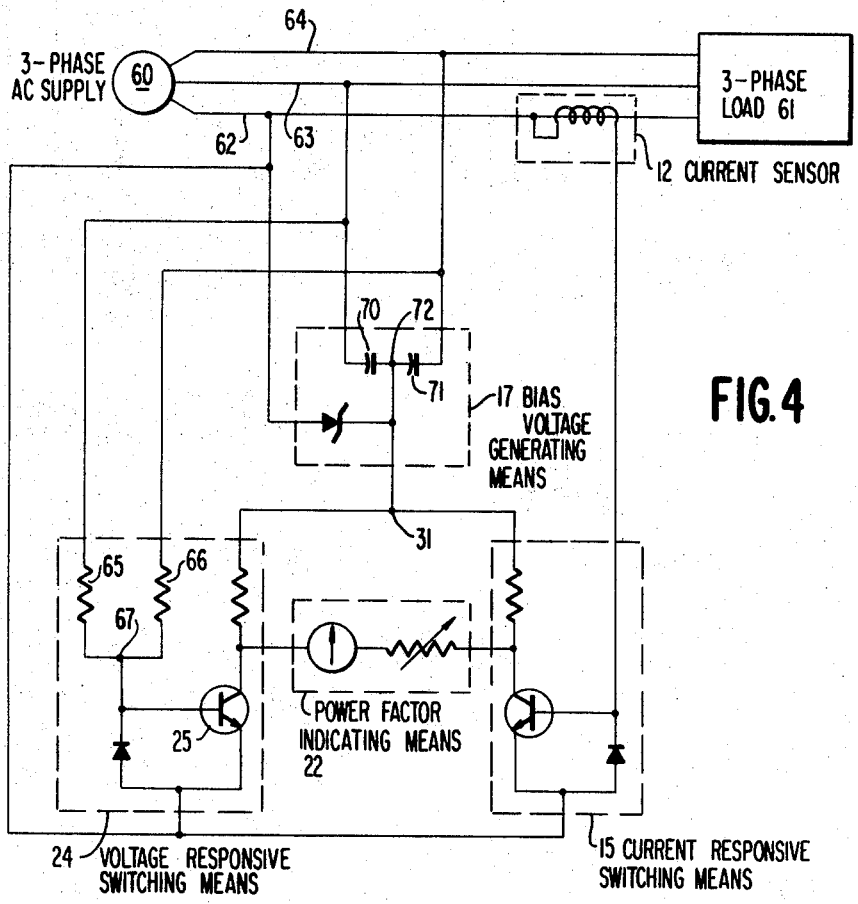
FIG. 4 is a specific embodiment of a power factor transducer and associated indicating means adapted for measuring power factor in a balanced three-phase power system.

In the following discussion like numerals refer to like elements throughout. In the specific embodiment shown in FIG. 1 a single-phase AC source 10 energizes a single-phase load 11. Line current is measured by a line current sensor 12, specifically a current transformer 13. A voltage is thereby produced on a conductor 14 which is in phase with the line current and responsive thereto for controlling a line current responsive switching means 15. This switching means includes an NPN transistor 16 which is energized by a bias voltage generating means 17 and coupled thereto by a resistor 20. A diode 21 is poled to conduct from the emitter to the base of the transistor 16 so that the transistor is biased on only during alternate half cycles of a given polarity. During half cycles of the opposite polarity, the diode 21 is forward biased and the transistor 16 is not conductive. Therefore, the current responsive switching means in this particular embodiment effectively is responsive to the positive going zero crossing of line current to cause the bias voltage generating means 17 to be coupled to a return. The current responsive switching means acts as a switch which changes its conductive state at a predetermined line current condition. This current responsive switching means 15 is additionally adapted to be coupled to a power factor indicating means 22.

With this transducer it is necessary to define a power factor voltage as that voltage which is in phase with line current at unity power factor. In a single phase circuit such as shown in FIG. 1, the power factor voltage is the line voltage. It is not line voltage in multiphase circuits as will be described hereinafter.

A conductor 23 serves as a reference and return and is connected to the bias voltage generating means 17, the line current switching means 15 and a power factor voltage responsive switching means 24, which is also responsive to a predetermined power factor voltage to change its conductive state. In the illustrated embodiment this predetermined condition is effectively the positive going zero crossing of the power factor voltage because an NPN transistor 25 has its emitter connected to the conductor 23 and its collector coupled through a resistor 26 to the bias voltage generating means 17. A diode 27 is connected to conduct current from the emitter electrode to the base electrode. The base electrode is connected to the line by a resistor 30. Hence, the power factor voltage switching means also changes its conductive state at a power factor voltage condition corresponding to the predetermined line current condition, namely the positive going zero voltage crossing.

In combination, the current responsive switching means 15 and the voltage responsive switching means 24 form a bridge circuit with input terminals 31 and 32 connected to the bias voltage generating means; and output terminals 33 and 34, to the collectors of the transistors 25 and 16 respectively. The output terminals 33 and 34 are adapted for connection to the power factor indicating means 22. If the power system being monitored is at unity power factor, both the positive going zero crossings of line current and line or power factor voltage occur simultaneously. Therefore, the output terminals 33 and 34 go from the bias voltage to substantially zero simultaneously with no current passing through the power factor indicating means. If a nonunity power factor exists, the positive going zero crossings will not occur simultaneously and the bridge will be unbalanced with the resulting current flowing through the power factor indicating means 22. By properly adjusting the power factor indicating means 22, the magnitude of the average current therethrough indicates the power factor magnitude while the current direction indicates whether the power factor is leading or lagging.

If a bias were supplied constantly by the bias voltage generating means 17, it would be possible to obtain false readings. In accordance with this invention, the bridge circuit is energized only at predetermined portions of line current or voltage. However, it is only necessary that the pulse exist for a time period which slightly exceeds the time defined by the desired range of power factors. As power factors in the range between 0.5 lagging and 0.5 leading are normally encountered, the bias needs to exist for a time period slightly in excess of a positive zero crossing plus or minus 60°. Further, to avoid unwanted pulses of the opposite polarity, the bias voltage should not energize the bridge circuit during opposite half cycles. In the specific circuit a capacitor 35 provides a voltage which exists for the desired time period while the Zener diode 36 substantially shorts the bridge input during the remaining time.

Figure 3:
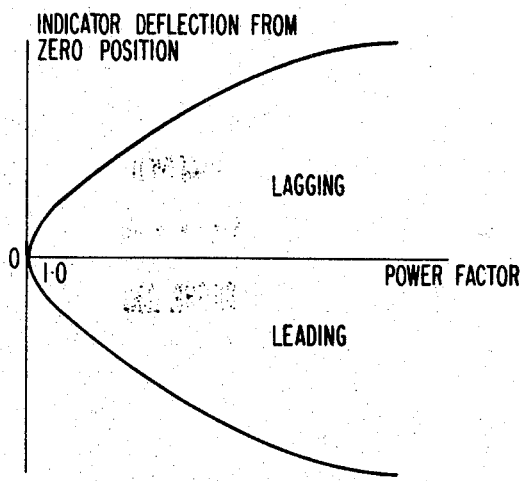
FIG. 3 illustrates the output of a zero center ammeter which may be associated with the embodiment of this invention shown in FIG. 1.

Operation of the circuit shown in FIG. 1 may be better understood by referencing FIGS. 2 and 3 in conjunction with FIG. 1. FIG. 2 graphically depicts three circuit conditions in the three vertical columns A, B, and C. Column A graphically depicts a unity power factor; column B, a lagging power factor; and column C, a leading power factor. Graph 40 represents line voltage; and graph 41, line current. The bias voltage generating means 17 produces a voltage represented as a square wave during substantially the positive going half cycle of line voltage. This voltage is presented in graph 42. When the bias voltage comes on, both the line current and line voltage responsive switching means 15 and 24 are in their nonconductive states so both outputs simultaneously shift to the bias voltage as shown in graphs 43 and 44. No current passes through the power factor indicating means 22 as shown in graph 45.

As both positive-going zero crossings occur simultaneously in the situation of column A, both switching means switch to a conductive state simultaneously. Therefore, as shown in graphs 43 and 44, the collector potentials shift simultaneously. No current passes through the indicator as shown in graph 45. Therefore, the average current is zero and a zero reading is produced on the indicator as illustrated in graph 46 and shown in FIG. 3.

Again in column B, the bias potential of graph 42 remains the same with reference to the power factor or line voltage. Both line voltage and line current responsive switching means outputs go to the potential simultaneously as shown in graphs 43 and 44. However, the positive-going zero crossing of line voltage occurs before positive-going zero crossing of line current. Therefore, the line voltage responsive switching means becomes conductive first and a potential exists across the indicating means 22 until the current responsive switching means 15 becomes conductive. This current is represented as a negative going pulse having a width which is determined by the time difference between the zero crossings of line voltage and current.

In column C line current, in graph 41, leads line voltage, in graph 40, and again the bias potential in graph 42 is centered about the line voltage. In this case, the output from the voltage responsive switching means 24 stays at the bias level until after the current responsive switching means 15 has changed state to thereby produce a positive current pulse shown in graph 45. The indicating means reacts in accordance with the graph in FIG. 3.

In the specific circuit shown in FIG. 1, the power factor indicating means 22 comprises a zero center current meter 50 and a series, scale-adjusting potentiometer 51. The meter 50 responds to negative going pulses by deflecting to the left through an angle determined by the time average current therethrough. As the current magnitude is substantially constant, the pulse width is related to the phase displacement. Therefore, as shown in graph 46 in column A, the meter 50 remains at zero. In column B the indicator deflects to the left; in column C, to the right. In the specific example of FIG. 1, the pointer deflects according to the graph of FIG. 3. When the line voltage and current are in phase, no current pulses are applied to the power factor indicating means 22. During nonunity power factor operation, only unidirectional pulses are applied thereby minimizing pointer flutter which occurred when pulses of opposite polarity were applied. It will be obvious that additional means may be utilized in place of this specific embodiment of the power factor indicating means. Such pulses are readily adapted for conversion to digital outputs by a relatively simple analog to digital converters. Other indicating means are also readily apparent.

The circuit of FIG. 1 is also readily adapted to measure power factor in a three phase system. Power factor in a three phase system is normally defined in terms of line current and line-to-neutral voltage; that is, untiy power factor exists when the line-to-neutral voltage is in phase with line current. Such a line neutral voltage is readily obtainable in Y configurations. However, three wire systems may be connected in either Y or delta. In either case, the line-to-line voltage is not in phase with line-to-neutral voltage. Therefore, it is necessary to convert the line-to-line voltage to something equivalent to the line-to-neutral voltage. This is the defined "power factor voltage" of a three phase system. As will become evident, if this voltage is obtained, knowledge of the circuit configuration is not necessary. Line-to-line voltages can be used to energize a transducer directly.

In FIG. 4, the three-phase A-C supply 60 energizes a three-phase load 61. Conductors 62, 63 and 64 are phase conductors A, B and C respectively. In this specific embodiment, the current sensor 12 is placed in the phase A conductor 62. If the load and supply voltages are balanced, the circuit of FIG. 1 can be modified to indicate power factor in this system. To accomplish this, a power factor voltage must be obtained and, in accordance with the prior discussion, this is the line-to-neutral voltage from neutral to the conductor 62.

Resistors 65 and 66 are connected in series from the conductor 63 to the conductor 64. A junction 67 formed by the resistors 65 and 66 is connected to the base of the transistor 25 in the voltage responsive switching means 24. A vector analysis shows that the voltage at the junction 67 with reference to the conductor 62 is in phase with the line-to-neutral voltage of phase A. This is, by definition, the power factor voltage which is in phase with the line current in the conductor 62 at unity power factor.

The bias voltage for energizing the current responsive switching means 15 and the voltage responsive switching means 24 is obtained by connecting capacitors 70 and 71 in series from the conductor 63 to the conductor 64. A junction 72 between the capacitors 70 and 71 is connected to the input terminal 31. Another vector analysis will show that the voltage at the junction 72 with reference to the conductor 62 leads the line-to-neutral voltage for the conductor 62 by 90°. Therefore, it also leads the power factor voltage by substantially 90°; and both switching means 15 and 24 are energized substantially 90° before the zero crossing of the power factor voltage. The voltage responsive switching means 24 changes its conductive state with the positive going zero crossing of the power factor voltage; the current responsive switching means 15, with the positive going zero crossing of line current.

As will now be obvious, the circuit of FIG. 1 is easily adapted to measure power in a three-phase system by modifying the resistive and capacitive networks. As the transducer is connected directly to the three line conductors, it is not necessary to have a neutral connection. Furthermore, it is possible to measure the power factor without having knowledge of the circuit configuration.

In accordance with this invention, therefore, a power factor transducer includes a bias means for generating a D-C bias for a predetermined time period defined by predetermined range of power factors with relation to a power factor voltage. While the positive going zero crossing has been chosen for purposes of convenience, any other point could be utilized such as positive or negative maximums with appropriate circuitry. Alternatively, the switching means could be independently actuated. The bridge circuit also has many digital and analog counterparts which perform the same function of providing an output with bias with either voltage or current but not both. Similarly, the zero center current meter can be replaced by analog-to-digital conversion means or other means capable of utilizing constant frequency, variable pulse width output generated when the bridge is imbalanced. It is, therefore, intended to cover all such modifications as fall within the claims such as different bias circuits, switching circuits or indicating circuits.

What is claimed as new and desired to be secured by Letters Patent of the United States is:

1. A power factor indicating means adapted for connection to a power circuit to measure line voltage and line current and thereby indicate a predetermined power factor range about unity power factor comprising:
    (a) means intermittently generating a bias voltage through a time period defined by the predetermined power factor range and centered on a given circuit voltage condition;
    (b) first switching means energized by said bias means and responsive to line voltage to be switched from a first to a second conductive state upon the occurrence of a given line voltage condition;
    (c) second switching means energized by said bias means and responsive to line current to be switched from a first to a second conductive state upon the occurrence of a given line current condition analogous to the given line voltage condition; and
    (d) means connected through said first and second switching means to said bias means and energized by the bias voltage when only one of said switching means is in the second conductive state for indicating the time difference between the given line voltage and current conditions, the time difference being variable in accordance with the power factor of the power circuit.

2. A power factor indicating means as recited in claim 1 wherein the given line voltage and current conditions are the values thereof analogous to the positive going zero crossings of line current and a voltage which is in phase with the current at unity power factor, said bias means being energized by the power circuit to generate the bias voltage during substantially all the positive going half cycles of the power factor voltage.

3. A power factor indicating means as recited in claim 2 wherein the bias means includes capacitive means and constant voltage means in series across the power circuit to produce the bias voltage across said constant voltage means during the positive going half cycle of line voltage.

4. A power factor indicating means as recited in claim 2 adapted to indicated power factor in a balanced, three-phase circuit, said bias means generating the bias voltage during the positive going half cycle of line-neutral voltage of the phase in which current is being monitored.

5. A power factor indicating means as recited in claim 4 wherein current is being monitored in a first phase, constant voltage means being connected to the first phase and to capacitive means connected to each of the other phases, said constant voltage means generating bias voltage thereacross during the positive going half cycle of the first phase line-to-neutral voltage.

6. A power factor indicating means as recited in claim 2 wherein said first and second switching means are energized in parallel by said bias means, said first switching means being switched to a conductive state substantially at the positive going zero crossing of power factor voltage and the second switching means being switched to a conductive state substantially at the positive going zero crossing of line current.

7. A power factor indicating means as recited in claim 6 adapted for use in a single phase circuit wherein in said first switching means comprises a switching transistor and a resistive impedance and a unidirectional conducting means connected in series across the power lines and connected to the base of the transistor to thereby turn on the transistor at the positive going zero crossing of line voltage.

8. A power factor indicating means as recited in claim 6 adapted for three phase measurement in which said first switching means comprises a switching transistor and a pair of resistors connected to the other phases, and forming a junction therebetween, a unidirectional conducting means connected between said resistive junction and the phase conductor in which current is measured, the voltage across said unidirectional conducting means being applied to said switching transistor.

References Cited

UNITED STATES PATENTS 2,953,722   9/1960   Willis _____ 324—83X

OTHER REFERENCES

D.E.S. Isle; Electronics, January 1954; pp. 234 and 236.

ALFRED E. SMITH, Primary Examiner